Figure 1:
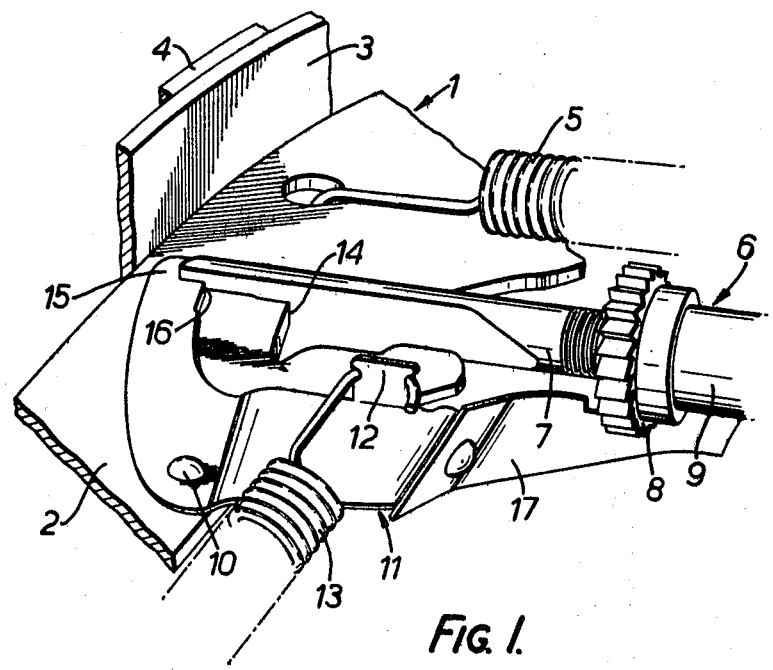

United States Patent [19]

Conrad et al.

[11] 4,385,681
[45] May 31, 1983

[54] DRUM BRAKES HAVING AUTOMATIC ADJUSTERS

[75] Inventors: Willibrod Conrad, Ochtendung; Karl-Heinz Jungmann, Neuwied, both of Fed. Rep. of Germany

[73] Assignee: Lucas Industries Limited, Birmingham, England

[21] Appl. No.: 151,299

[22] Filed: May 19, 1980

[30] Foreign Application Priority Data

May 21, 1979 [GB] United Kingdom ................ 7917530

[51] Int. Cl.³ ............................................ F16D 65/56
[52] U.S. Cl. ........................ 188/79.5 B; 188/196 BA; 192/111 A
[58] Field of Search .................. 188/79.5 B, 79.5 GC, 188/196 BA; 192/111 A

[56] References Cited

U.S. PATENT DOCUMENTS

| 2,046,420 | 7/1936 | La Brie | 188/79.5 B |
| 2,072,014 | 2/1937 | Smith | 188/79.5 B |
| 2,264,454 | 12/1941 | Para | 188/79.5 GC |
| 2,301,272 | 11/1942 | Goepfrich | 188/79.5 B |
| 2,670,059 | 2/1954 | Link | 188/79.5 B |
| 3,963,100 | 6/1976 | Kaub | 188/196 BA |

FOREIGN PATENT DOCUMENTS

| 766811 | 4/1934 | France | 188/79.5 B |
| 1507550 | 4/1978 | United Kingdom | 188/79.5 B |
| 2056599 | 3/1981 | United Kingdom | 188/79.5 B |

*Primary Examiner*—George E. A. Halvosa
*Attorney, Agent, or Firm*—Scrivener, Clarke, Scrivener and Johnson

[57] ABSTRACT

A brake has an automatic adjuster including a pawl and ratchet mechanism, the adjuster comprising a bimetallic strip arranged to disengage the pawl from the ratchet when a predetermined temperature is attained. When there is excessive travel of the pawl, the strip permits re-engagement of the pawl with the ratchet to thereby permit adjustment. The pawl is preferably formed on a lever pivotally connected to one of the shoes of the brake and the bimetallic strip is connected to the lever.

6 Claims, 5 Drawing Figures

DRUM BRAKES HAVING AUTOMATIC ADJUSTERS

This invention relates to drum brakes having automatic adjusters, in particular pawl and ratchet adjusters.

Such adjusters comprise a strut which includes a screw threaded rod carrying a nut; ratchet teeth on the nut; and a pawl, which is caused to move when the running clearance of the brake exceeds a predetermined amount, and in so moving to drag the teeth, and progressively to wind the nut along the rod, to adjust the length of the strut. The pawl is arranged to move tangentially with respect to the nut, through a limited arc, and to be biased radially inwards so as to remain in contact with the teeth on the nut throughout the arcuate movement.

When a vehicle descends a long hill, the driver makes repeated brake actuations, and brake drums on the vehicle become hot, and therefore expand. A conventional pawl and ratchet adjuster cannot distinguish between drum expansion and lining wear: both are sensed as a requirement to take up the resulting slack in the adjuster. The problem arises therefore that the brake can become over-adjusted so that when the drum cools and contracts on to the shoes, the brake might become locked on, with possibly disastrous results.

To overcome the problem of over-adjustment, it has been proposed to incorporate a bimetallic strip into the adjuster, which acts to deflect the pawl out of engagement with the ratchet teeth when the drum, and thus the strip, are hot, so that the adjuster does not function at all until the drum cools and the pawl is deflected into engagement with the ratchet teeth.

However, linings wear most rapidly when the drum becomes hot and it is therefore undesirable to disable the adjuster completely. The problem of over-adjustment through overheating is alleviated but at the expense of possible under-adjustment because of disablement of the adjuster when there is rapid lining wear.

To take account of this disadvantage, it has been proposed to arrange a bimetallic strip to act merely to slow down the rate at which the adjuster takes up the slack, when the drum is hot, so that a little adjustment capacity is retained. However, even with that proposal, the requirement neither to over-, nor under-adjust can only be met under certain conditions.

It is the aim of the invention to provide a drum brake which obviates, or at least reduces the abovementioned disadvantage.

In accordance with the invention, there is provided a brake having an automatic adjuster including a pawl and ratchet mechanism, said adjuster comprising a bimetallic strip arranged to disengage the pawl from the ratchet when a predetermined temperature is attained, wherein the arrangement is such that upon excessive travel of the pawl the strip permits re-engagement of the pawl with the ratchet to thereby permit adjustment.

Figure 2:
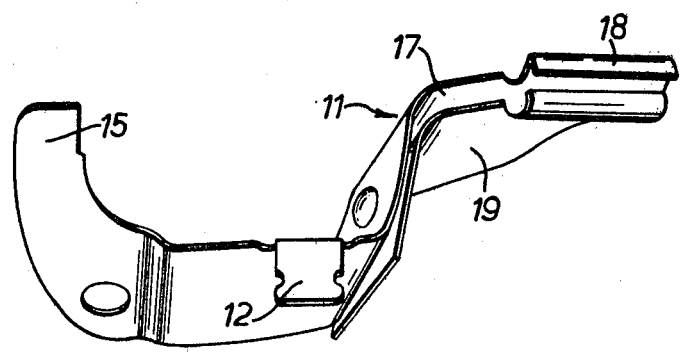

A brake in accordance with the invention will now be further described, by way of example, by reference to the accompanying drawings, in which:

FIG. 1 is a pictorial view of part of a drum brake having an automatic adjuster, FIG. 2 is a pictorial view of a part of the brake of FIG. 1, FIGS. 3, 4 and 5 are diagrammatic views illustrating stages in the operation of the adjuster of FIG. 1.

The brake comprises a brake shoe 1 having a web 2 and a platform 3 to which is secured a lining 4 of friction material. The shoe 1 is urged towards another shoe (not shown) and away from the drum (not shown) by a return spring 5. A hydraulic brake actuator (not shown) urges the shoes apart to apply the brake.

An adjustable length strut 6 fits between the shoes, and provides a stop to which the shoes return after a brake application.

The strut also forms part of a handbrake linkage, by which the shoes may be mechanically applied to the drum. The strut 6 comprises a threaded rod 7, a nut 8, and a barrel 9 which receives the free end of the rod 7 in its hollow interior. The nut 8 is formed with ratchet teeth on an external cylindrical surface.

Pivoted to the shoe 1, at a pivot pin 10, is a pawl lever 11. A lug 12 on the lever receives a pawl spring 13 which reacts against the shoe 1, and urges the pawl lever 11 clockwise about the pivot pin 10. It is arranged that the return spring 5 has a stronger effect than the pawl spring 13 so that, when the brake is not actuated, the shoe 1 engages firmly in the bottom 14 of a slot in the rod 7, and the hook 15 of the lever 11 engages the abutment 16 of the rod 7.

When the brake is actuated the shoe 1 moves to the left, opening a gap between the shoe and the bottom 14 of the slot. The lever 11 therefore rotates clockwise, under the influence of the spring 13 and the arm 17 of the lever 11 moves tangentially to the nut 8. The lever 11 is provided with some free play towards and away from the shoe web 2, and the spring 13 has the further effect of pulling the arm 17 into engagement with the ratchet teeth on the nut 8.

The pawl lever 11 is shown separately in FIG. 2, and includes a pawl 18 formed on the end of the arm 17. Pivoted to the arm 17 is a bimetallic strip 19 which lies mainly against the arm 17, with the higher expansion metal on that side of the strip nearest the arm.

Figure 3:
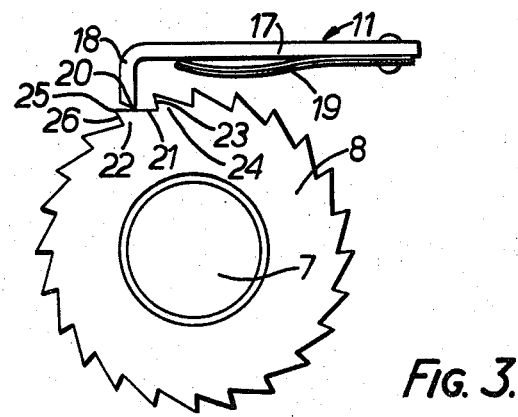
Figure 4:
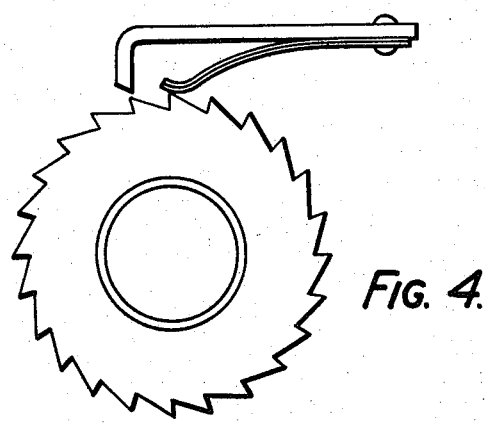
Figure 5:
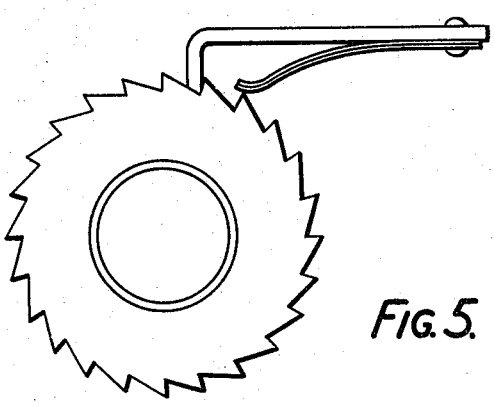

The disposition of the pawl 18 and the strip 19, in relation to the ratchet teeth on the nut 8, is shown diagrammatically in FIGS. 3 to 5, and the operation of the adjuster is described in relation thereto.

When the brake is applied, the tip 20 of the pawl 18 moves to the right, sliding over the flank 21 of one tooth 22 to approach the edge 23 of the next tooth 24. Providing the pawl tip 20 does not quite reach the edge 23 the nut 8 will not turn, even if the brake is repeatedly applied, and so no adjustment takes place. If the pawl tip 20 does reach the edge 23, and then moves just a small distance further, the tooth 24 is dragged to the right that small distance, rotating the nut clockwise. When the brake is released the pawl returns, but now, because the nut had rotated clockwise slightly, the pawl tip just clicks over the end 25 of the flank 21. On the next brake application, when the pawl again moves to the right, the next edge 26 is picked up by pawl tip and is dragged to the right by the pawl, so that the nut rotates through an angle corresponding to one whole ratchet tooth pitch. This rotation winds the nut 8 along the threaded rod 7 in a direction to reduce the shoe travel (and hence to reduce the pawl travel).

On every brake application when the pawl travel exceeds one tooth pitch, the nut rotates one tooth pitch, this continuing until the nut has been screwed far enough along the threaded rod to reduce the shoe travel, and hence to reduce the pawl travel to just less than one tooth pitch.

If the brake is substantially out of adjustment then the pawl travel may be so great as to rotate the nut two, or even more, whole pitches per application: as the pawl travel becomes less due to the nut being gradually wound along the rod, each application drags the nut round only one tooth pitch at a time, until at last the pawl does not move far enough to drag the nut round even one tooth pitch, when adjustment is complete.

In addition to the linings becoming worn, the reason for excess pawl travel is if the drum expands, when the pawl has to travel a distance exceeding one tooth pitch before the shoes come into contact with the drum. If sufficient brake applications take place with the drum expanded, the nut might be screwed so far along the rod that, when the drum cools, the shoes cannot retract far enough to clear the drum at all, thus locking the brake on.

The above-described bimetallic strip 19 bends upon being heated, as shown in FIG. 4, until the strip contacts the ratchet teeth, the degree of bending being sufficient also to urge the pawl tip, by reaction, clear of the ratchet teeth, thus having an effect similar to that of the bimetallic strips in the earlier proposals mentioned above. However, if the pawl and strip should travel an excessive distance, the strip, by being arranged as shown, moves clear of the teeth, allowing the pawl once more to engage the teeth, as shown in FIG. 5. Thus the effect is that the drum expansion is substantially ignored by the adjuster. It is possible, at least theoretically, to arrange the mutual disposition of the components exactly to ignore the drum expansion; to lift the pawl clear of the teeth for a pawl movement exactly equal to the drum expansion and then to lower the pawl onto the teeth, if the pawl should travel any extra distance. The pawl will travel this extra distance if the linings wear whilst the drum is hot and permits adjustment of the brake. However, such accuracy is not essential, as the compensation only needs to be adequate, not perfect.

With the above-described automatic adjuster, during and following conditions of thermal expansion and contraction of the drum, the adjustment slack is neither too much nor too little, under a wide range of conditions. Furthermore, the above-described brake is cheap to make, and effective and reliable in operation.

We claim:

1. A brake comprising: at least one friction lining; a friction surface which is engaged by the friction lining upon brake actuation; an adjuster for adjusting the running clearance between said friction lining and said friction surface; a pawl and ratchet mechanism for operating said adjuster; means for moving said pawl relative to said ratchet in response to movement of said friction lining relative to said friction surface; and a bimetallic strip operative when the temperature of the brake is above a predetermined value to disengage the pawl from the ratchet during an initial portion only of the movement in an adjusting direction of the pawl relative to the ratchet, whereby when the temperature of said brake is above said predetermined value the amount of movement of said friction lining relative to said friction surface necessary to operate said adjuster is greater than the amount of movement necessary when the temperature of said brake is below said predetermined value, said friction lining being secured to a brake shoe and said pawl being formed on a lever pivotally connected to the brake shoe, the bimetallic strip being secured to the lever.

2. A brake according to claim 1 wherein the bimetallic strip reacts on the ratchet to move the pawl out of engagement with the ratchet.

3. A brake according to any preceding claim wherein the ratchet is a ratchet wheel and the bimetallic strip is operative to move the pawl radially away from the ratchet wheel to disengage the pawl from the ratchet.

4. A brake according to claim 1 wherein the bimetallic strip reacts with a first portion of the ratchet to move the pawl out of engagement with the ratchet during the initial portion only of the movement of the pawl relative to the ratchet but during excess movement of said pawl, said strip reacts with another portion of the ratchet enabling said pawl to move back into engagement with said ratchet.

5. A brake according to claims 1, or 2, wherein the ratchet is a toothed ratchet wheel and the bimetallic strip reacts on teeth of the ratchet wheel to move said pawl clear of the ratchet wheel and when said pawl and said strip travel an excessive distance said strip is arranged to move beyond said ratchet wheel teeth to enable said pawl to re-engage said ratchet wheel.

6. A brake comprising: at least one friction lining; a friction surface which is engaged by the friction lining upon brake actuation; an adjuster for adjusting the running clearance between said friction lining and said friction surface; a pawl and ratchet mechanism for operating said adjuster; means for moving said pawl relative to said ratchet in response to movement of said friction lining relative to said friction surface; said pawl engaging said ratchet to operate said adjuster upon predetermined movement of said friction lining relative to said friction surface and the temperature of said brake is below a predetermined value; and a bimetallic strip having an operative connection with said pawl and arranged that when the temperature of said brake is above said predetermined value said strip disengages the pawl from the ratchet during an initial portion only of the movement of the pawl relative to the ratchet and then permits said pawl to re-engage said ratchet when the relative movement of said pawl is in excess of said initial portion of said movement, whereby the amount of movement of said friction lining relative to said friction surface necessary to operate said adjuster is greater when the temperature of said brake is above said predetermined value than when said brake is below said predetermined value, said friction lining being secured to a brake shoe and said pawl being formed on a lever pivotally connected to the brake shoe, the bimetallic strip being secured to the lever.

* * * * *